United States Patent
Cipresso et al.

(10) Patent No.: US 8,291,432 B2
(45) Date of Patent: Oct. 16, 2012

(54) PROVIDING INVOCATION CONTEXT TO IMS SERVICE PROVIDER APPLICATIONS

(75) Inventors: Teodoro Cipresso, San Jose, CA (US); Gary I. Mazo, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 127 days.

(21) Appl. No.: 12/957,876

(22) Filed: Dec. 1, 2010

(65) Prior Publication Data

US 2012/0144404 A1 Jun. 7, 2012

(51) Int. Cl.
*G06F 13/00* (2006.01)

(52) U.S. Cl. .................... 719/313; 719/314; 719/328

(58) Field of Classification Search ............ 719/313, 719/314, 328
See application file for complete search history.

(56) References Cited

U.S. PATENT DOCUMENTS

| | | | |
|---|---|---|---|
| 6,948,174 B2 | 9/2005 | Chiang et al. | |
| 7,421,501 B2* | 9/2008 | Critchley et al. | 709/227 |
| 7,421,701 B2 | 9/2008 | Dinh et al. | |
| 7,613,832 B2* | 11/2009 | Srinivasan et al. | 709/245 |
| 7,617,459 B2 | 11/2009 | Ho et al. | |
| 7,664,867 B2* | 2/2010 | Lockhart, Jr. | 709/230 |
| 7,668,836 B2 | 2/2010 | Fung et al. | |
| 2005/0021689 A1* | 1/2005 | Marvin et al. | 709/220 |
| 2005/0144457 A1* | 6/2005 | Lee et al. | 713/176 |
| 2007/0083524 A1 | 4/2007 | Fung et al. | |
| 2007/0094283 A1 | 4/2007 | Fung et al. | |
| 2009/0093237 A1 | 4/2009 | Levenshteyn et al. | |
| 2009/0125524 A1* | 5/2009 | Das et al. | 707/10 |

OTHER PUBLICATIONS

O. Bertin, "Integrating IMS With Web Services: to Enable IP Multimedia Service Oriented Architectures", IMSAA-08—2nd International Conference on Internet Multimedia Services Architecture and Application, Bangalore, India, Dec. 1, 2008.
S. Ho, "Connecting to IMS Using XML, SOAP and Web Services", IMS Technical Conference, Koenigswinter, Germany, Oct. 15-17, 2002, 39 Pages (Abstract).
IBM, "IMS Enterprise Suite SOAP Gateway", pp. 1-3.
"IMS General Web Services—Summary".

* cited by examiner

*Primary Examiner* — Andy Ho
(74) *Attorney, Agent, or Firm* — Law Office of Jim Boice

(57) ABSTRACT

A computer implemented method invokes a business application in response to receipt of a request Simple Object Access Protocol (SOAP) message. The request SOAP message requests an operation that is defined in a Web Services Description Language (WSDL) service. To implement the operations defined in the WSDL service, the WSDL service is provided as input to a tool that generates a business application which corresponds to the supplied WSDL service. The SOAP BODY from the request SOAP message is converted into an unformatted data structure for inputting to the business application, while information from the SOAP HEADER is retained in order to generate a reply SOAP message that contains execution results.

12 Claims, 4 Drawing Sheets

PROVIDING INVOCATION CONTEXT TO IMS SERVICE PROVIDER APPLICATIONS

BACKGROUND

The present disclosure relates to the field of computers, and specifically to accessing a business application through the use of computers. Still more particularly, the present disclosure relates to invoking hierarchical business applications.

Within computing systems, services are accessed through different types of systems. An older type of system is known as an Information Management System (IMS), which is a database and transactional management system that can be accessed by TCP/IP/XML messages. Another type of system is referenced as a Web Services Description Language (WSDL) system, which defines services as collections of ports/endpoints that can be accessed by HTTP/SOAP messages.

BRIEF SUMMARY

In one embodiment of the present disclosure, a computer implemented method invokes a business application in response to receipt of a request Simple Object Access Protocol (SOAP) message. The request SOAP message requests an operation that is defined in a Web Services Description Language (WSDL) service. To implement the operations defined in the WSDL service, the WSDL service is provided as input to a tool that generates a business application which corresponds to the supplied WSDL service. The SOAP BODY from the request SOAP message is converted into an unformatted data structure for inputting to the business application, while information from the SOAP HEADER is retained in order to generate a reply SOAP message that contains execution results.

In one embodiment, a computer system comprises: a central processing unit; and a memory coupled to the central processing unit, wherein the memory comprises software that, when executed, causes the central processing unit to implement: receiving, from a web service client, a request Simple Object Access Protocol (SOAP) message for an operation defined in a Web Services Description Language (WSDL) service; generating, in a business application server, a business application by using a template that utilizes a joint hierarchical database and transaction processing system to process transactions, wherein the business application performs the operation defined in a request SOAP HEADER for the WSDL service; converting the request SOAP HEADER and a request SOAP BODY from the request SOAP message into unformatted data structures; placing the unformatted data structures on to a message queue in the business application server; updating a protocol header from the request SOAP message to define a service context of the request SOAP HEADER and the request SOAP BODY on the message queue, wherein the service context describes a location of the unformatted data structures for the request SOAP HEADER and the request SOAP BODY in the message queue; invoking a data structure insertion Application Program Interface (API) to send the unformatted data structures from the message queue to the business application for execution; using the unformatted data structures from the request SOAP BODY as inputs for execution by the business application; invoking the data structure insertion API to set and commit a response SOAP data structure to the message queue; using the response SOAP data structure to place resulting data from the execution by the business application on to the message queue; constructing a reply SOAP message from results of the execution by the business application; and transmitting the reply SOAP message to the web service client.

In one embodiment, a computer program product comprises: a computer readable storage medium having computer readable program code embodied therewith, the computer readable program code comprising computer readable program code to: receive, from a web service client, a request Simple Object Access Protocol (SOAP) message for an operation defined in a Web Services Description Language (WSDL) service; generate, in a business application server, a business application by using a template that utilizes a joint hierarchical database and transaction processing system to process transactions, wherein the business application performs the operation defined in a request SOAP HEADER for the WSDL service; convert the request SOAP HEADER and a request SOAP BODY from the request SOAP message into unformatted data structures; place the unformatted data structures on to a message queue in the business application server; update a protocol header from the request SOAP message to define a service context of the request SOAP HEADER and the request SOAP BODY on the message queue, wherein the service context describes a location of the unformatted data structures for the request SOAP HEADER and the request SOAP BODY in the message queue; invoke a data structure insertion Application Program Interface (API) to send the unformatted data structures from the message queue to the business application for execution; use the unformatted data structures from the request SOAP BODY as inputs for execution by the business application; invoke the data structure insertion API to set and commit a response SOAP data structure to the message queue; use the response SOAP data structure to place resulting data from the execution by the business application on to the message queue; construct a reply SOAP message from results of the execution by the business application; and transmit the reply SOAP message to the web service client.

DETAILED DESCRIPTION

As will be appreciated by one skilled in the art, the present disclosure may be embodied as a system, method or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Figure 1:
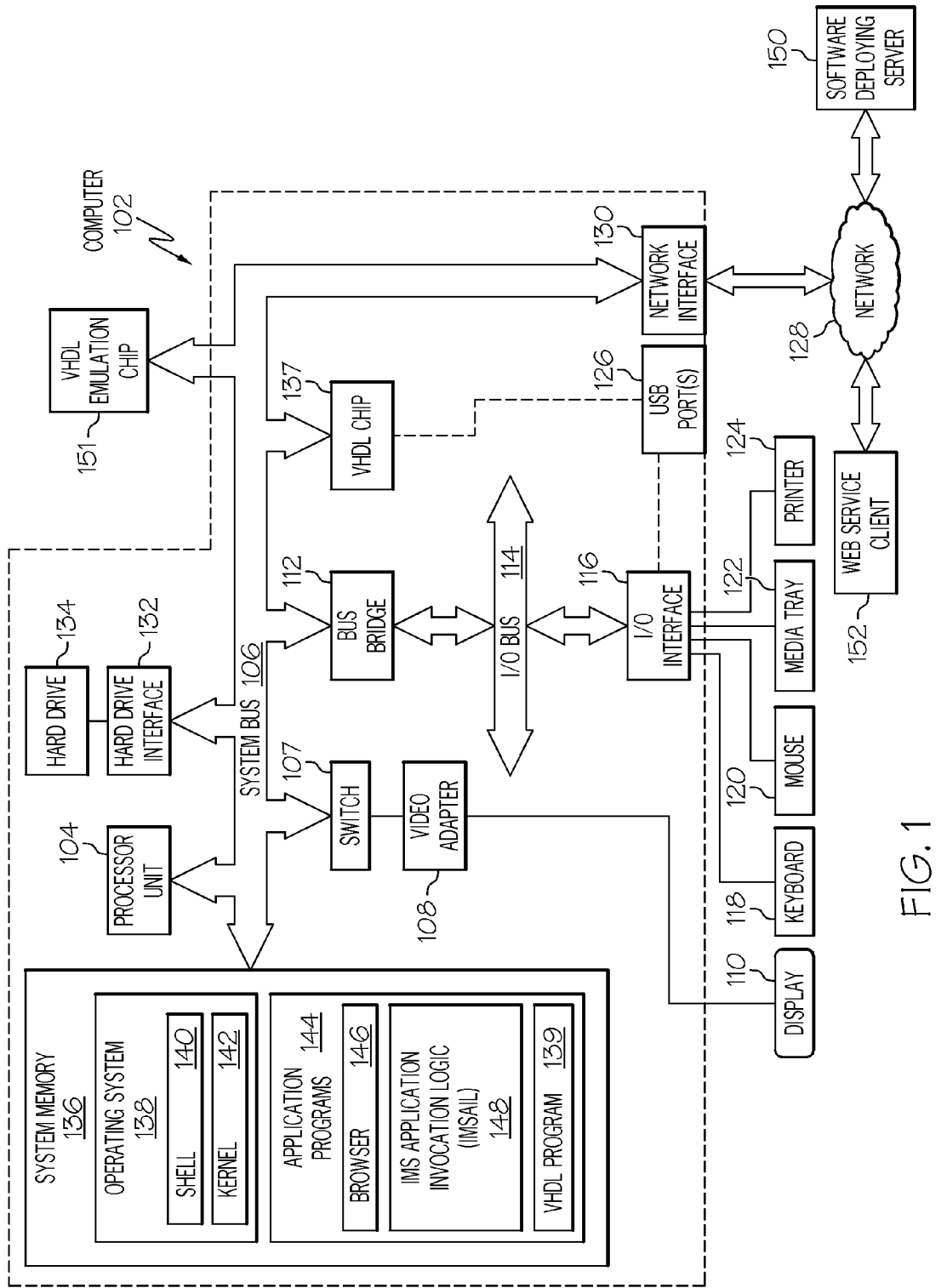
FIG. 1 depicts an exemplary computer in which the present disclosure may be implemented.

With reference now to the figures, and in particular to FIG. 1, there is depicted a block diagram of an exemplary computer 102, which may be utilized by the present disclosure. Note that some or all of the exemplary architecture, including both depicted hardware and software, shown for and within computer 102 may be utilized by software deploying server 150, and/or web service client 152.

Computer 102 includes a processor unit 104 that is coupled to a system bus 106. Processor unit 104 may utilize one or more processors, each of which has one or more processor cores. A video adapter 108, which drives/supports a display 110, is also coupled to system bus 106. In one embodiment, a switch 107 couples the video adapter 108 to the system bus 106. Alternatively, the switch 107 may couple the video adapter 108 to the display 110. In either embodiment, the switch 107 is a switch, which may be mechanical, that allows the display 110 to be coupled to the system bus 106, and thus to be functional only upon execution of instructions (e.g., IMS application invocation logic—IMSAIL 148 described below) that support the processes described herein. Note that while Information Management Systems (IMS) are used for exemplary purposes, the present disclosure is equally applicable to invoking business applications of various non-WSDL architectures, including hierarchical systems.

System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a printer 124, and (if a VHDL chip 137 is not utilized in a manner described below), external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150 and/or web service client 152 via network 128 using a network interface 130. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present disclosure will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other described computer systems.

Application programs 144 in computer 102's system memory (as well as software deploying server 150's system memory) also include an Information Management System Application Invocation Logic (IMSAIL) 148. IMSAIL 148 includes code for implementing the processes described below, including those described in FIGS. 2-3. In one embodiment, computer 102 is able to download IMSAIL 148 from software deploying server 150, including in an on-demand basis, such that the code from IMSAIL 148 is not downloaded until runtime or otherwise immediately needed by computer 102. Note further that, in one embodiment of the present disclosure, software deploying server 150 performs all of the functions associated with the present disclosure (including execution of IMSAIL 148), thus freeing computer 102 from having to use its own internal computing resources to execute IMSAIL 148.

Also stored in system memory 136 is a VHDL (VHSIC hardware description language) program 139. VHDL is an exemplary design-entry language for field programmable gate arrays (FPGAs), application specific integrated circuits (ASICs), and other similar electronic devices. In one embodiment, execution of instructions from IMSAIL 148 causes VHDL program 139 to configure VHDL chip 137, which may be an FPGA, ASIC, etc.

In another embodiment of the present disclosure, execution of instructions from IMSAIL 148 results in a utilization of VHDL program 139 to program a VHDL emulation chip 151. VHDL emulation chip 151 may incorporate a similar architecture as described above for VHDL chip 137. Once IMSAIL 148 and VHDL program 139 program VHDL emulation chip 151, VHDL emulation chip 151 performs, as hardware, some or all functions described by one or more executions of some or all of the instructions found in IMSAIL 148. That is, the VHDL emulation chip 151 is a hardware emulation of some or all of the software instructions found in IMSAIL 148. In one embodiment, VHDL emulation chip 151 is a programmable read only memory (PROM) that, once burned in accordance with instructions from IMSAIL 148 and VHDL program 139, is permanently transformed into a new circuitry that performs the functions needed to perform the process described below in FIGS. 2-3.

The hardware elements depicted in computer 102 are not intended to be exhaustive, but rather are representative to highlight essential components required by the present disclosure. For instance, computer 102 may include alternate memory storage devices such as magnetic cassettes, digital versatile disks (DVDs), Bernoulli cartridges, and the like. These and other variations are intended to be within the spirit and scope of the present disclosure.

Figure 2:
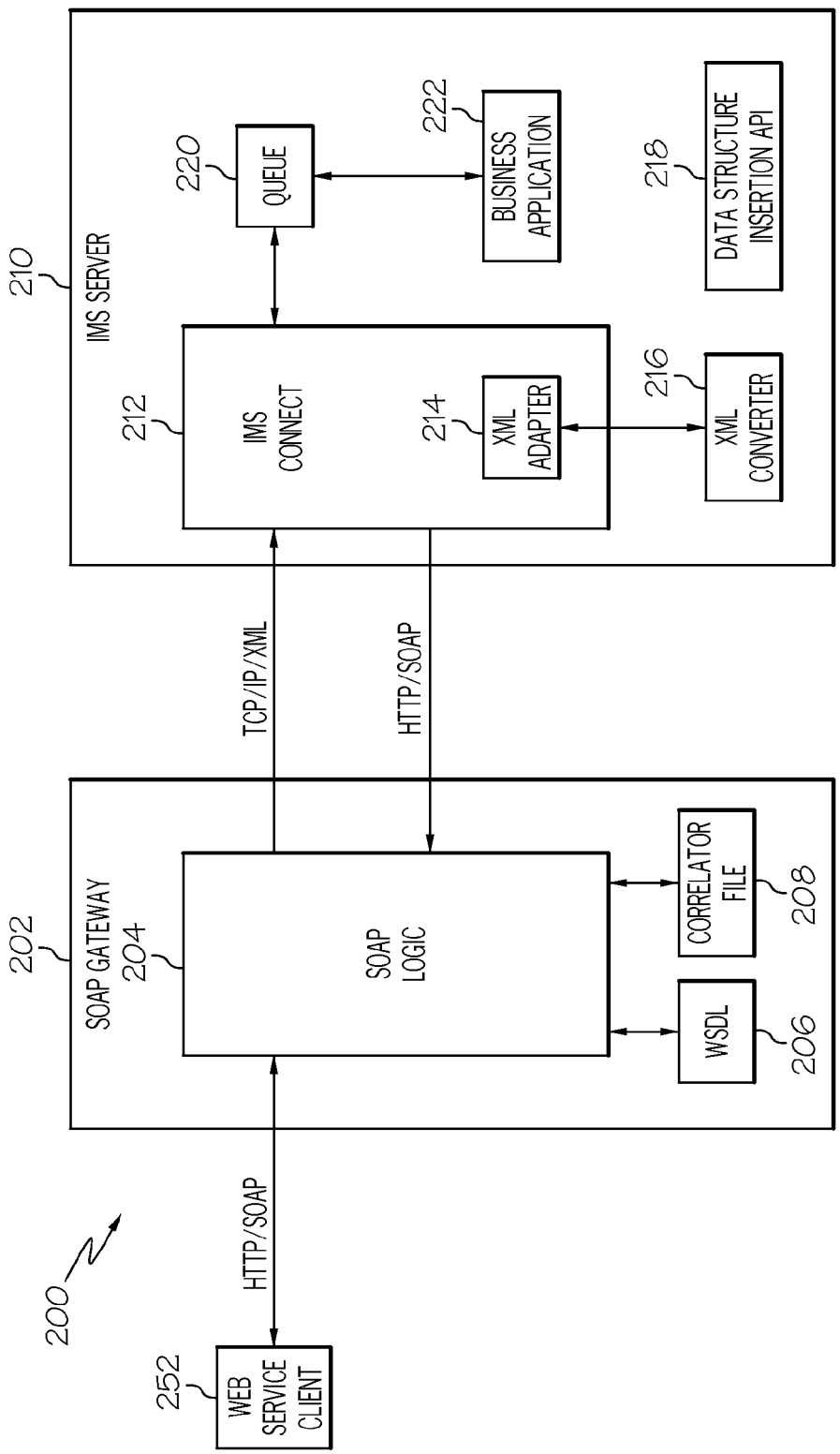
FIG. 2 illustrates an exemplary IMS server used in one embodiment of the present disclosure.

With reference now to FIG. 2, an exemplary system 200 in which the present disclosure may be implemented is presented. A web service client 252 (analogous to web service client 152 shown in FIG. 1) is coupled to an IMS server 210 (analogous to computer 102 shown in FIG. 1) via a SOAP gateway 202 (analogous to IMSAIL 148 depicted in FIG. 1). In another embodiment, SOAP gateway 202 is a physical server device. In a manner described in further detail below, web service client 252 communicates with the SOAP gateway 202 using Hypertext Transfer Protocol (HTTP) Simple Object Access Protocol (SOAP) messages. As described below, SOAP logic 204 accesses WSDL 206, which provides definitions, types, bindings, and ports/endpoints needed to access a WSDL-defined operation/service. A correlator file 208 maps this WSDL-defined operation/service to a specific business application 222 in a one-way manner. That is, the correlator file 208 knows which business application 222 is being called by a WSDL service/operation from WSDL 206, but the business application 222 is not "told" by the correlation file 208 which WSDL service/operation is calling the business application 222. This information is provided in a unique way using a data structure insertion API 218, as described below.

Communication between the SOAP gateway 202 and the IMS server 210 is via Transmission Control Protocol/Internet Protocol (TCP/IP) after adding an appropriate IMS connect header using eXtended Markup Language (XML). The IMS server 210, using an XML adapter 214 and an XML converter 216, is able to convert messages from XML back into HTTP/SOAP for transmission to the SOAP gateway 202.

As described in detail below, a business application 222, such as an IMS business application or other similar hierarchical application, receives inputs and provides outputs from execution of the business application 222 to the IMS connect via a queue 220, through the use of a data structure insertion API 218.

Figure 3:
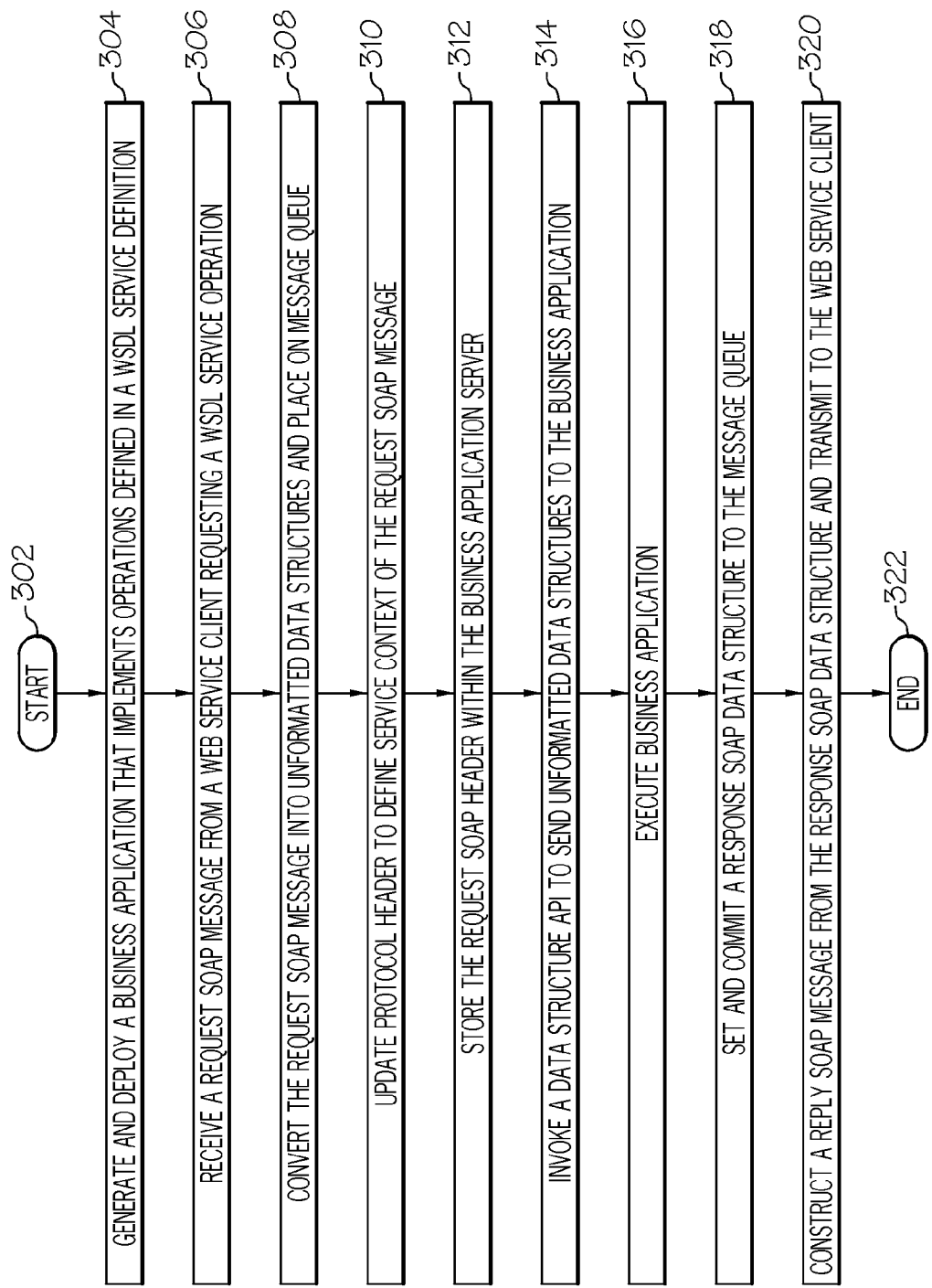
FIG. 3 is a high level flow chart of one or more exemplary steps taken by a computer to invoke a business application in response to receipt of a request SOAP message.

With reference now to FIG. 3, a high-level flow chart of one or more exemplary steps taken by a computer to invoke a business application in response to receipt of a request SOAP message is displayed. After initiator block 302, a business application (e.g., an IMS service application) is generated when a WSDL document is provided as an input to a tool (a tool used to visually design, construct, test, and deploy Web services, portals, etc.), as described in block 304. This business application is not generated at execution time as described in block 306, but rather is generated at development time. The business application is later executed when a SOAP message that corresponds to it is received. Thus, as depicted in block 304, a business application is generated in a business application server (e.g., IMS server 210 shown in FIG. 2) in a "top down" manner, in which an existing WSDL operation is defined as a new IMS business application. This business application is based on a template that utilizes a joint hierarchical database and transaction processing system to process transactions, and performs the operation defined in the corresponding WSDL service operation.

As described in block 306, a request SOAP message is thereafter received from a web service client, requesting the WSDL service operation that corresponds to the business application. The request SOAP message includes a request SOAP HEADER and a request SOAP BODY. Information within the request SOAP HEADER describes/defines which business application is needed. For example, assume that the request SOAP HEADER indicates that "Operation X" is being requested. Operation X is a normal WSDL service operation, (e.g., GET a file, PROCESS data, STORE data, etc.). However, the present disclosure enables the calling/execution of a complementary (analogous) operation within IMS by reading a description of the WSDL operation from the request SOAP HEADER, and then selecting (using logic such as IMSAIL 148 shown in FIG. 1) an IMS template for such an operation. In one embodiment, this template is further modified/adjusted if it does not perform the exact same operation described in the WSDL service and/or the request SOAP HEADER. This modification/adjustment is performed by the SOAP server loading metadata, which includes the name of an XML Converter module that performs XML to data structure conversion for the selected operation that corresponds to the selected web service operation. This metadata is thus used to modify the IMS template to generate the needed IMS business application.

As described in block 308, the request SOAP HEADER and the request SOAP BODY from the request SOAP message are converted into unformatted data structures by the SOAP gateway/server sending the received request SOAP message to the XML converter module in the IMS server. The unformatted data structures are then placed on to a message queue in the IMS server.

As described in block 310, a protocol header from the request SOAP message is updated to define a service context of the request SOAP HEADER and the request SOAP BODY on the message queue. This service context describes a location of the unformatted data structures for the request SOAP HEADER and the request SOAP BODY in the message queue in the IMS server. In one embodiment, the XML converter module calls a data structure insertion API (see element 218 in FIG. 2) to place the data structures for the request SOAP HEADER and request SOAP BODY on to the Message Queue. The Message Queue can contain one more or Messages that consist of one or more Message Segments having the structure {LL, ZZ, DATA} where LL is a 2-byte length prefix, ZZ is a 2-byte reserved area, and DATA is a 32763-byte unstructured byte stream. In one embodiment, a service name and an operation name are appended to the service context. This service name is a name of a set of system functions that are invoked by the business application, and the operation name is a pseudonym that describes the function of the set of system functions that are invoked by the business application. For example, a set of system functions defined in WSDL may be "GETXKJL.0", while the more descriptive pseudonym would be "GET FILES FROM LOCAL DISK".

As described in block 312, the request SOAP HEADER is stored within the business application server (e.g., the IMS server) in order to directly provide context information about a WSDL operation to the business application. As described in block 314, a data structure insertion Application Program Interface (API) is then invoked to send the unformatted data structures from the message queue to the business application for execution. This data structure insertion API updates a Protocol Header, which is specific to the API, with the Service Context and locations of the request SOAP HEADER and request SOAP BODY data structures in the message queue. The Service Context contains the target namespace, service name, port name, and operation name of the WSDL service.

Note that in one embodiment, the data structure insertion API segments the request SOAP HEADER and request SOAP BODY data structures, if larger than 32763 bytes, while creating a message to place on the Message Queue. That is, if it is determined that one of the unformatted data structures exceeds a maximum size permitted by the message queue, then the unformatted data structures are partitioned into message units that are smaller than the maximum size permitted by the message queue. A provider header is created and applied to each of the units. This provider header includes a language descriptor for the business application, a total number of message units that have been partitioned out of the unformatted data structures, and a segment number that describes a segment order for each unit.

With reference now to block 316, the newly created IMS business application is executed, using the unformatted data structures from the request SOAP BODY as inputs for execution by the business application. In one embodiment, the business application that implements the WSDL operation is scheduled by a Transaction Manager and is provided the message that was placed on the Message Queue by the XML Converter as input. The Business Application retrieves the first segment of the Message to obtain the Protocol Header which contains the Service Context. Using the Service Context, the Business Application branches to an internal procedure corresponding to the operation invoked by the Web service client. The Business Application references the Protocol Header to determine if a request SOAP HEADER exists in the Message it was provided as input by the Transaction Manager. If a request SOAP HEADER exists, the Business Application invokes a data structure retrieval API to retrieve the request SOAP HEADER data structure from the Message Queue. The data structure retrieval API recreates the request SOAP HEADER data structure by reading Message Segments from the Message Queue and, when complete, returns a pointer to an allocated area that contains the rebuilt data structure. The API references the Protocol Header to ascertain the number of segments to read from the message queue. The Business Application reads the request SOAP HEADER data structure and performs related business logic. The Business Application references the protocol header to determine if a request SOAP BODY exists in the Message it was provided as input by the Transaction Manager. If a request SOAP BODY exists, the Business Application invokes a data structure retrieval API to retrieve the request SOAP BODY data structure from the message queue. The data structure retrieval API then recreates the request SOAP BODY data structure by reading segments from the message queue and, when complete, returns a pointer to an area that contains the rebuilt data structure. The API references the Protocol Header to determine the number of segments to read from the Message Queue. The Business Application reads the request SOAP BODY data structure and performs related business logic.

As described in block 318, the data structure insertion API is then invoked to set and commit a response SOAP data structure to the message queue. That is, using the data structure insertion API, the business application prepares the response SOAP HEADER data structure to set the response SOAP HEADER data structure. However, the response SOAP HEADER data structure is not yet placed on the Message Queue. First, the data structure insertion API updates the Protocol Header with the Message Segment number and count, size in bytes, and memory address of the response SOAP HEADER data structure. The business application then prepares the response SOAP BODY data structure and invokes a data structure insertion API to set the response SOAP BODY data structure and commit the response SOAP HEADER and BODY data structures to the Message Queue. The data structure insertion API updates the Protocol Header with the Message Segment number and count, size in bytes, and memory address of the response SOAP BODY data structure and places the protocol header on to the message queue.

The response SOAP data structure is used to place resulting data from the execution by the business application on to the message queue. The data structure insertion API reads the response SOAP HEADER and BODY data structures using the Message Segment number and count, size in bytes, and memory address that were recorded previously in the Protocol Header and inserts each data structure into the message queue.

As described in block 320, a reply SOAP message is constructed from the results of the execution by the business application (using the unformatted BODY data structures as inputs). In one embodiment, the Business Application returns to the Transaction Manager and the Message created by the data structure insertion API is sent to the XML Converter module. The XML Converter module retrieves the first segment of the Message to obtain the Protocol Header. The XML Converter module references the Protocol Header to determine if a response SOAP HEADER exists in the Message. If a response SOAP HEADER exists, the XML Converter module invokes a data structure retrieval API to retrieve the request SOAP HEADER data structure from the Message Queue. The data structure retrieval API recreates the response SOAP HEADER data structure by reading Message Segments from the Message Queue and, when complete, returns a pointer to an allocated area that contains the rebuilt data structure. The XML converter converts the SOAP HEADER response data structure into XML format. The XML Converter module references the Protocol Header to determine if a response SOAP BODY exists in the Message. If a response SOAP BODY exists, The XML Converter module invokes a data structure retrieval API to retrieve the request SOAP BODY data structure from the Message Queue. The data structure retrieval API recreates the response SOAP BODY data structure by reading Message Segments from the Message Queue and, when complete, returns a pointer to an allocated area that contains the rebuilt data structure. The XML converter converts the response SOAP BODY data structure into XML format. The XML representations of the response SOAP HEADER and BODY data structures are sent to the SOAP Server (i.e., SOAP gateway). The SOAP Server constructs a response SOAP message using the XML representations of the response SOAP HEADER and BODY data structures, and performs optional security actions. The SOAP Server then sends the response SOAP message to the Web service client, and the process ends (terminator block 322).

As described herein, the present disclosure describes a method, system and/or program product to provide context and infrastructure for new IMS service provider applications to correctly handle service requests that involve multiple operations, SOAP HEADER and SOAP fault processing, and to overcome the 32 KB message size limit.

Message Processing Programs (MPPs) (e.g., IMSAIL 148 and data structure insertion API 218 described above) are provided access to the service invocation context, allowing implementation of a multi-operation Web service provider. These MPPs can read and write SOAP HEADERs and issue SOAP Faults. Furthermore, language structures mapped to a SOAP BODY, HEADER or Fault message may exceed 32 KB and contain unbounded arrays. Language structures that exceed 32 KB are transmitted using segmentation. Unbounded arrays are handled through, for example, the use of PL/I REFER or other development languages and constructs.

Thus, the method described herein may be used with a system of APIs that handle retrieval and insertion of language structures into the IMS Message.

Figure 4:
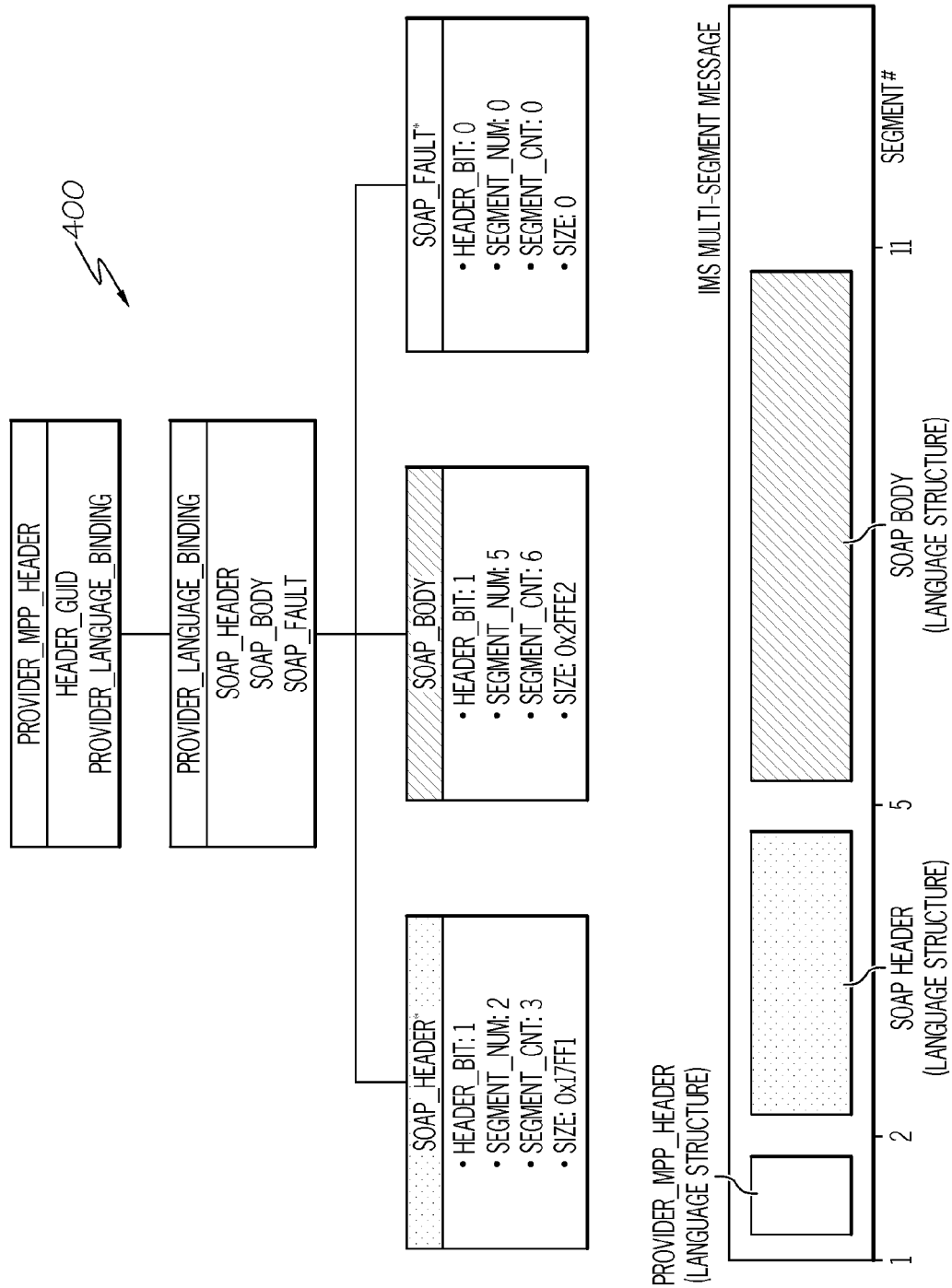
FIG. 4 is a diagram that illustrates the relationships between the information stored in a SOAP HEADER and an IMS/TCP/IP/XML message.

In one embodiment, up to two language structures are used for each operation input and output message, as depicted in FIG. 4. These language structures correspond to the SOAP BODY that is sent or received at execution time. In the case of PL/I the first language structure contains the REFER objects which specify limits for unbounded arrays and the second contains the input or output message data. Whether or not one or two language structures are generated, it is always the case that the full contents of the input or output message are stored in a single language structure. Since the REFER object structure is no longer needed after the input or output message structure has been allocated, the method does not include it in IMS messages that flow between IMS Connect and the MPP.

One embodiment of the disclosure presented herein also provides metadata for inclusion within the IMS message. Therefore IMS messages received and sent by the MPP are required to include a header. In the following exemplary pseudo source text, the structure @IRZ_ASYNC_MSG_HEADER serves as a container for the required metadata:

```
/***********************************************************************
 * REQUIRED, SYMMETRIC ASYNCHRONOUS MESSAGE HEADER SEGMENT FOR USE
 * WITH IRZPWSIO APIS: IRZQGETS, IRZQSETS, IRZXGETS, IRZXSETS.
 * @VERSION E527A9DA-8413-4FB0-AE3F-99E02FBC7E92
 ***********************************************************************/
DCL 01 @IRZ_ASYNC_MSG_HEADER_PTR POINTER;
DCL 01 @IRZ_ASYNC_MSG_HEADER UNALIGNED
       BASED(@IRZ_ASYNC_MSG_HEADER_PTR),
   02 LL                            FIXED BIN (15) INIT(0),
   02 ZZ                            FIXED BIN (15) INIT(0),
   02 TRANCODE                      CHAR (08) INIT(''),
   02 HEADER_GUID                   CHAR (36) INIT
      ('E527A9DA-8413-4FB0-AE3F-99E02FBC7E92'),
   02 SERVICE_CONTEXT,
   03 TARGET_NAMESPACE              WCHAR (1024) VARYING INIT(''),
   03 SERVICE_NAME                  WCHAR (0512) VARYING INIT(''),
   03 PORT_NAME                     WCHAR (0512) VARYING INIT(''),
   03 OPERATION_NAME                WCHAR (0512) VARYING INIT(''),
   02 LANGUAGE_BINDING,
   03 SOAP_HEADER_BIT               BIT (1) ALIGNED INIT('0'B),
   03 SOAP_HEADER,
   04 HEADER_STRUCT_NAME            WCHAR (100) VARYING INIT(''),
   04 HEADER_STRUCT_SEGMENT_NUM     FIXED BIN (31) INIT(0),
   04 HEADER_STRUCT_SEGMENT_CNT     FIXED BIN (31) INIT(0),
   04 HEADER_STRUCT_SIZE            FIXED BIN (31) INIT(0),
   04 HEADER_STRUCT_PTR             POINTER,
   03 SOAP_BODY_BIT                 BIT (1) ALIGNED INIT('0'B),
   03 SOAP_BODY,
   04 BODY_STRUCT_NAME              WCHAR (100) VARYING INIT(''),
   04 BODY_STRUCT_SEGMENT_NUM       FIXED BIN (31) INIT(0),
   04 BODY_STRUCT_SEGMENT_CNT       FIXED BIN (31) INIT(0),
   04 BODY_STRUCT_SIZE              FIXED BIN (31) INIT(0),
   04 BODY_STRUCT_PTR               POINTER,
   03 SOAP_FAULT_BIT                BIT (1) ALIGNED INIT('0'B),
   03 SOAP_FAULT,
   04 FAULT_STRUCT_NAME             WCHAR (100) VARYING INIT(''),
   04 FAULT_STRUCT_SEGMENT_NUM      FIXED BIN (31) INIT(0),
   04 FAULT_STRUCT_SEGMENT_CNT      FIXED BIN (31) INIT(0),
   04 FAULT_STRUCT_SIZE             FIXED BIN (31) INIT(0),
   04 FAULT_STRUCT_PTR              POINTER;
```

Referring again to FIG. 4, diagram 400 illustrates the relationships between the information stored in the header PROVIDER_MPP_HEADER and an IMS message. Message segment numbers and counts are used to locate and delimit the language structures for the SOAP BODY, SOAP HEADER, and SOAP Fault. As explained earlier, REFER object structures are no longer needed after the structure containing the SOAP HEADER, BODY, or Fault data is allocated, so they are not included in the IMS message.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the disclosure of the present application in detail and by reference to illustrative embodiments thereof, it will be apparent that modifications and variations are possible without departing from the scope of the disclosure defined in the appended claims.

What is claimed is:

1. A computer implemented method of invoking a business application, the computer implemented method comprising:
generating and deploying, in a business application server, a business application that implements operations defined for a Web Services Description Language (WSDL) service, wherein the business application is generated by using a WSDL document from the WSDL service as an input to a template that utilizes a joint hierarchical database and transaction processing system to process transactions;
receiving, from a web service client, a request Simple Object Access Protocol (SOAP) message for a WSDL service operation from the WSDL service, wherein the request SOAP message comprises a request SOAP HEADER and a request SOAP BODY;
converting the request SOAP HEADER and the request SOAP BODY from the request SOAP message into unformatted data structures;
placing the unformatted data structures on to a message queue in the business application server;
updating a protocol header from the request SOAP message to define a service context of the request SOAP HEADER and the request SOAP BODY on the message queue, wherein the service context describes a location of the unformatted data structures for the request SOAP HEADER and the request SOAP BODY in the message queue;
storing the request SOAP HEADER within the business application server in order to directly provide context information about a WSDL operation to the business application;
invoking a data structure insertion Application Program Interface (API) to send the unformatted data structures from the message queue to the business application for execution;
using the unformatted data structures from the request SOAP BODY as inputs for execution by the business application;
invoking the data structure insertion API to set and commit a response SOAP data structure to the message queue;
using the response SOAP data structure to place resulting data from the execution by the business application on to the message queue;
constructing a reply SOAP message from results of the execution by the business application; and
transmitting the reply SOAP message to the web service client.

2. The computer implemented method of claim 1, wherein the business application is an Information Management System (IMS) application.

3. The computer implemented method of claim 1, further comprising:
appending a service name and an operation name to the service context, wherein the service name is a name of a set of system functions that are invoked by the business application, and wherein the operation name is a pseudonym that describes the function of the set of system functions that are invoked by the business application.

4. The computer implemented method of claim 1, further comprising:
in response to determining that one of the unformatted data structures exceeds a maximum size permitted by the message queue:
partitioning the unformatted data structures into message units that are smaller than the maximum size permitted by the message queue;
creating and applying a provider header to each of the units, wherein the provider header comprises a language descriptor for the business application, a total number of message units that have been partitioned out of the unformatted data structures, and a segment number that describes a segment order for each unit.

5. A computer program product for providing invocation context to service provider applications, the computer program product comprising:
a computer readable storage media;
first program instructions to generate and deploy, in a business application server, a business application that implements operations defined for a Web Services Description Language (WSDL) service, wherein the business application is generated by using a WSDL document from the WSDL service as an input to a template that utilizes a joint hierarchical database and transaction processing system to process transactions;

second program instructions to receive, from a web service client, a request Simple Object Access Protocol (SOAP) message for a WSDL service operation from the WSDL service, wherein the request SOAP message comprises a request SOAP HEADER and a request SOAP BODY;

third program instructions to convert the request SOAP HEADER and the request SOAP BODY from the request SOAP message into unformatted data structures;

fourth program instructions to place the unformatted data structures on to a message queue in the business application server;

fifth program instructions to update a protocol header from the request SOAP message to define a service context of the request SOAP HEADER and the request SOAP BODY on the message queue, wherein the service context describes a location of the unformatted data structures for the request SOAP HEADER and the request SOAP BODY in the message queue;

sixth program instructions to invoke a data structure insertion Application Program Interface (API) to send the unformatted data structures from the message queue to the business application for execution;

seventh program instructions to use the unformatted data structures from the request SOAP BODY as inputs for execution by the business application;

eighth program instructions to invoke the data structure insertion API to set and commit a response SOAP data structure to the message queue;

ninth program instructions to use the response SOAP data structure to place resulting data from the execution by the business application on to the message queue;

tenth program instructions to construct a reply SOAP message from results of the execution by the business application; and eleventh program instructions to transmit the reply SOAP message to the web service client; and wherein the first, second, third, fourth, fifth, sixth, seventh, eighth, ninth, tenth, and eleventh program instructions are stored on the computer readable storage media.

6. The computer program product of claim 5, wherein the business application is an Information Management System (IMS) application.

7. The computer program product of claim 5, further comprising:

twelfth program instructions to append a service name and an operation name to the service context, wherein the service name is a name of a set of system functions that are invoked by the business application, and wherein the operation name is a pseudonym that describes the function of the set of system functions that are invoked by the business application, and wherein the twelfth program instructions are stored on the computer storage media.

8. The computer program product of claim 5, further comprising:

twelfth program instructions to, in response to determining that one of the unformatted data structures exceeds a maximum size permitted by the message queue:

partition the unformatted data structures into message units that are smaller than the maximum size permitted by the message queue; and create and apply a provider header to each of the units, wherein the provider header comprises a language descriptor for the business application, a total number of message units that have been partitioned out of the unformatted data structures, and a segment number that describes a segment order for each unit, and wherein the twelfth program instructions are stored on the computer storage media.

9. A computer system comprising:

a processor, a computer readable memory, and a computer readable storage media;

first program instructions to generate and deploy, in a business application server, a business application that implements operations defined for a Web Services Description Language (WSDL) service, wherein the business application is generated by using a WSDL document from the WSDL service as an input to a template that utilizes a joint hierarchical database and transaction processing system to process transactions;

second program instructions to receive, from a web service client, a request Simple Object Access Protocol (SOAP) message for a WSDL service operation from the WSDL service, wherein the request SOAP message comprises a request SOAP HEADER and a request SOAP BODY;

third program instructions to convert the request SOAP HEADER and the request SOAP BODY from the request SOAP message into unformatted data structures;

fourth program instructions to place the unformatted data structures on to a message queue in the business application server;

fifth program instructions to update a protocol header from the request SOAP message to define a service context of the request SOAP HEADER and the request SOAP BODY on the message queue, wherein the service context describes a location of the unformatted data structures for the request SOAP HEADER and the request SOAP BODY in the message queue;

sixth program instructions to invoke a data structure insertion Application Program Interface (API) to send the unformatted data structures from the message queue to the business application for execution;

seventh program instructions to use the unformatted data structures from the request SOAP BODY as inputs for execution by the business application;

eighth program instructions to invoke the data structure insertion API to set and commit a response SOAP data structure to the message queue;

ninth program instructions to use the response SOAP data structure to place resulting data from the execution by the business application on to the message queue;

tenth program instructions to construct a reply SOAP message from results of the execution by the business application; and eleventh program instructions to transmit the reply SOAP message to the web service client;

and wherein the first, second, third, fourth, fifth, sixth, seventh, eighth, ninth, tenth, and eleventh program instructions are stored on the computer readable storage media for execution by the processor via the computer readable memory.

10. The computer system of claim 9, wherein the business application is an Information Management System (IMS) application.

11. The computer system of claim 9, further comprising:

twelfth program instructions to append a service name and an operation name to the service context, wherein the service name is a name of a set of system functions that are invoked by the business application, and wherein the operation name is a pseudonym that describes the function of the set of system functions that are invoked by the business application, and wherein the twelfth program instructions are stored on the computer storage media for execution by the processor via the computer readable memory.

12. The computer system of claim 9, further comprising:
twelfth program instructions to, in response to determining that one of the unformatted data structures exceeds a maximum size permitted by the message queue:
  partition the unformatted data structures into message units that are smaller than the maximum size permitted by the message queue; and
  create and apply a provider header to each of the units, wherein the provider header comprises a language descriptor for the business application, a total number of message units that have been partitioned out of the unformatted data structures, and a segment number that describes a segment order for each unit,
and wherein the twelfth program instructions are stored on the computer storage media for execution by the processor via the computer readable memory.

* * * * *